United States Patent [19]
Kitai et al.

[11] 3,876,876
[45] Apr. 8, 1975

[54] CAMERA EXPOSURE TIME CONTROL DEVICE

[75] Inventors: Kiyoshi Kitai, Tokyo; Shinji Nagaoka, Chiba, both of Japan

[73] Assignee: Seiko Koki Kabushiki Kaisha, Tokyo, Japan

[22] Filed: Oct. 16, 1973

[21] Appl. No.: 406,806

[30] Foreign Application Priority Data
Oct. 17, 1972 Japan.............................. 47-10374

[52] U.S. Cl.................. 250/214 P; 354/23; 354/53
[51] Int. Cl. .......................................... H01j 39/12
[58] Field of Search..................... 250/214 R, 214 P; 95/10 CE, 10 CT, 10 CD, 10 FS; 307/238

[56] References Cited
UNITED STATES PATENTS

| | | | |
|---|---|---|---|
| 3,646,371 | 2/1972 | Flad | 307/238 |
| 3,703,130 | 11/1972 | Watanabe | 95/10 CT |
| 3,711,721 | 1/1973 | Hansen | 250/214 P |
| 3,748,979 | 7/1973 | Wada | 307/238 |
| 3,762,285 | 10/1973 | Tenkumo | 95/10 CE |
| 3,765,311 | 10/1973 | Nobusawa | 95/10 CT |

*Primary Examiner*—James W. Lawrence
*Assistant Examiner*—D. C. Nelms
*Attorney, Agent, or Firm*—Robert E. Burns; Emmanuel J. Lobato; Bruce L. Adams

[57] ABSTRACT

A device which determines the exposure time in a camera for a sensed scene brightness and in accordance with exposure time factors such as the ASA number of the film and the *f*-stop setting. The brightness of the scene is converted into a pulse train which is fed into a binary counter which develops the exposure time count. A switch is settable in accordance with the exposure time factors changes the input position of the pulse train into the counter thus varying the magnitude of the exposure time count for the number of pulses in the pulse train. The exposure time corresponds to the mangitude of the exposure time count and thus is determined in accordance with the brightness of the scene bring photographed and the predetermined exposure time factors.

10 Claims, 2 Drawing Figures

CAMERA EXPOSURE TIME CONTROL DEVICE

BACKGROUND OF THE INVENTION

The present invention relates to a camera exposure time control device.

Exposure time control systems of this type that are known in the art, generate a number of pulses corresponding in number to the brightness of a scene to be photographed and then count and store the number of pulses in an up-down counter which then counts down at the opening of the shutter until it reaches a zero count and generates another signal which closes the shutter of the camera.

Exposure time control devices in the prior art exposure time control system determine the exposure time for the sensed scene brightness but do not take into account other exposure time factors such as film sensitivity and aperture value.

SUMMARY OF THE INVENTION

The object of the present invention is to provide a camera exposure time control device that is capable of determining the exposure time for a sensed scene brightness and in accordance with predetermined exposure time factors such as film sensitivity and aperture value.

Another object of the present invention is to provide a digital type exposure time control device which counts and stores the number of pulses corresponding to a sensed scene brightness for converting these pulses into an exposure time count corresponding in time to the exposure time and having a magnitude which varies for the number of pulses counted in accordance with predetermined exposure time factors.

A further object of the present invention is to provide a display that indicates the exposure time that has been determined in accordance with the scene brightness and predetermined exposure time factors.

A still further object of the present invention is to provide a exposure time control device that is usable with the shutter control circuitry of the prior art exposure time control system.

These and other objects of the present invention are carried out by the device of the present invention for determining the exposure time in a camera for a sensed scene brightness and in accordance with predetermined exposure time factors. The device of the present invention comprises means responsive during use to the brightness of a scene to be photographed for developing an electric pulse train signal having a number of pulses in inverse proportion to the brightness of the scene and means receptive of the electric pulse train signal for converting same into an exposure time count corresponding in time to the exposure time and having a magnitude which varies for the number of pulses received in accordance with predetermined exposure time factors. The last mentioned means comprises counting means for counting the number of pulses in the electric pulse train signal including a first group of counting elements wherein anyone of which is receptive at the input thereof of the electric pulse train signal and a second group of counting elements developing a count which corresponds to the exposure time count wherein the magnitude of the final count depends upon which one of the first group of counting elements receive the electric pulse train signal. The aforesaid last mentioned means also includes switch means receptive of the electric pulse train signal and settable to positions corresponding to predetermined exposure time factors for selectively applying the electric pulse train signal to one of the first group of counting elements determined in accordance with predetermined exposure time factors. Thus the magnitude of the exposure time count and thereby the exposure time is determined in accordance with brightness of the scene being photographed and predetermined exposure time factors.

The means for developing the electric pulse train signal may comprise means responsive to the brightness of the sensed scene for developing an output signal having a time duration inversely proportional to the brightness of the sensed scene, a pulse generator for developing a continuous pulse train and gating means receptive of the output signal and the continuous pulse train for generating the electric pulse train signal. The gating means may comprise an AND gate.

The counting means of the present invention may comprise a binary digital counter including a plurality of serially connected flip-flops. The binary counter may also be an up-down counter so that the device of the present invention may function in the prior art type exposure system.

The device may further comprise indicating means receptive of the exposure time count in the second group of counting elements for indicating the corresponding exposure time. The indicating means may comprise a switching element connected to each output of the second group of counting elements and an indicator lamp connected to each switching elements and enabled thereby. The switching elements are connected to each other so that only the one indicating lamp corresponding to the actual exposure time is enabled to light up.

Having in mind the above and other objects that will be obvious from an understanding of the disclosure, the present invention comprises the combinations and arrangements of elements illustrated in the presently preferred embodiment of the present invention which is hereinafter set forth in sufficient detail to enable those persons skilld in the art to clearly understand the function, operation, construction, and advantages of it when read in conjunction with the accompanying drawings.

DESCRIPTION OF THE PREFERRED EMBODIMENT

Figure 1:
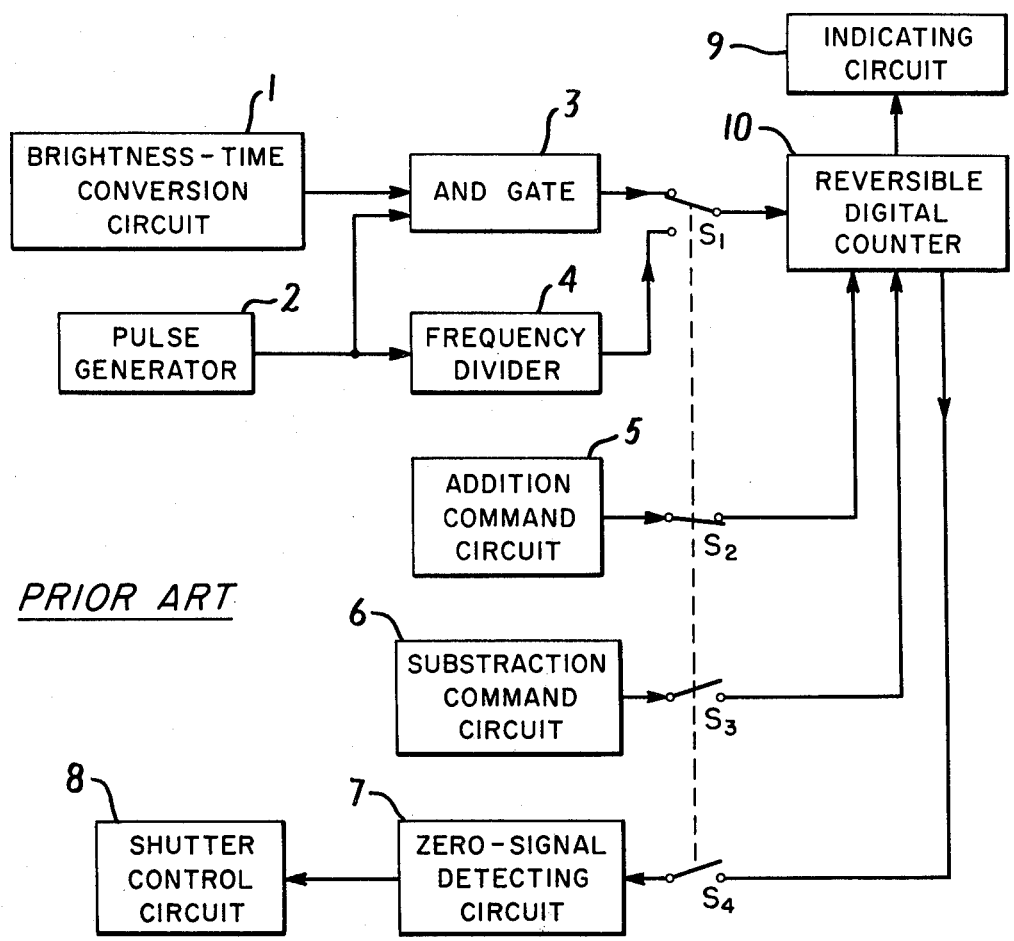
FIG. 1 is a block diagram of the prior art type digital exposure time control system for a camera.

FIG. 1 shows an example of a prior art digital type exposure time control system. The brightness to time conversion circuit 1 is utilized to develop an output time signal which varies in length in inverse proportion to the brightness of a sensed scene. Pulse generator 2 has a constant frequency and develops a continuous pulse train. The output of the brightness to time conversion circuit 1 and the pulse generator 2 are applied to AND gate 3 which gates the two signals and which results in a pulse train signal when there is an output for the brightness to time conversion circuit 1. The output of the pulse generator 2 is also applied to a frequency divider 4 which divides down the frequency of the pulse generator. The output of the AND gate 3 and the frequency divider 4 are each applied to one of two terminals of switch $S_1$. The movable contact of switch $S_1$ is connected to a digital up-down counter 10 which is receptive of digital pulses for counting same. The output of the digital counter 10 is connected to an indicating circuit 9 which indicates the count therein and is also connected through switch $S_4$ to a zero detecting circuit 7 which detects a count of zero in the digital counter and which develops a signal upon the occurrence of the zero count which is then applied to the shutter control circuit 8 which acts to close the shutter (not shown) at that point in time. Also provided are the addition command circuit 5 and the substraction command circuit 6 which are connected to the digital counter 10 through switches $S_2$ and $S_3$ respectively. The addition command circuit 5 enables the digital counter 10 to count up, while the substraction command circuit 6 enables the digital counter 10 to count down.

The group of switches $S_1$–$S_4$ are linked to each other and switch simultaneously. When the four switches are in the state as shown in FIG. 1, the digital counter is enabled to count up and it is enabled to receive the pulse train signal from the output of the AND gate 3. At this moment the substraction command circuit 6 and the zero detecting circuit 7 are disconnected from the digital counter 10. This point in time corresponds to the time just before the opening of the shutter and is started just after the release button of the camera has been pushed down and is the measuring to storage stage of the operation. During this stage of operation, the brightness to time conversion circuit 1 develops an output signal and a pulse train having a frequency equal to the frequency of the pulse generator 2 is applied to the digital counter 10 and the counter counts up and stores the number of pulses that were in the pulse train.

During the exposure stage of the operation, when the shutter of the camera first opens, all of the switches $S_1$–$S_4$ change state simultaneously. During this stage of operation, the digital counter is enabled to count down because the substraction command circuit 6 is now connected thereto and the zero detecting circuit 7 now detects the count in the digital counter 10. The digital counter 10 is counted down at the frequency of the pulse generator 2 after it has been divided by the frequency divider 4. Thus for a count of N in the counter, the frequency of the output signal from frequency divider 4 must be equal to the exposure time devided by N. When the count in the digital counter 10 equals zero, the zero detecting circuit 7 senses this count and develops a signal which enables the shutter control circuit 8 to close the shutter.

Figure 2:
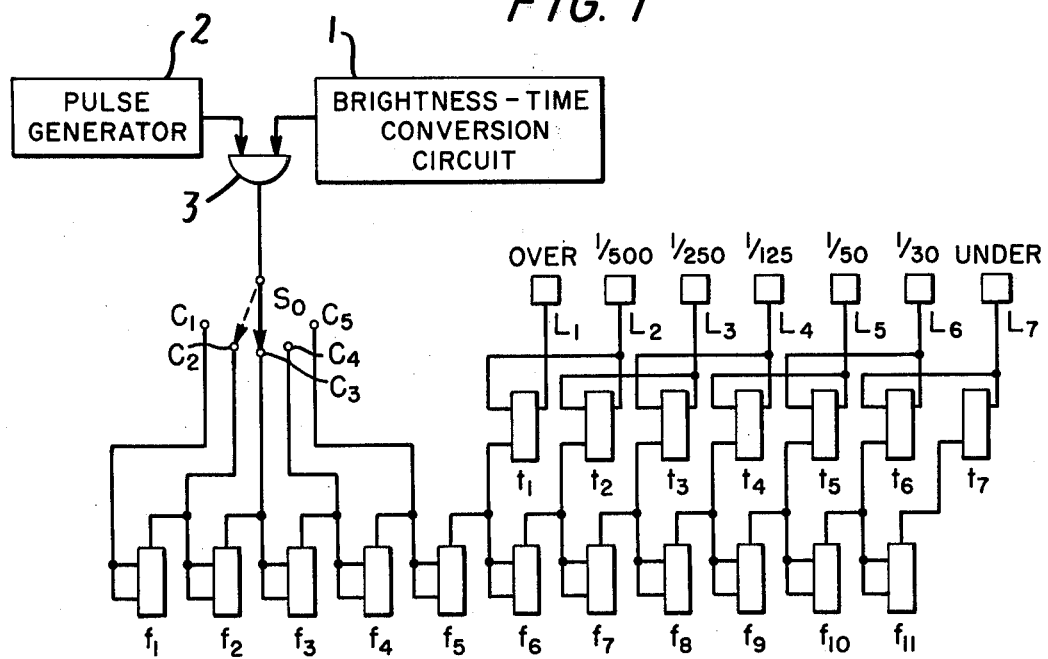
FIG. 2 is a block diagram of the exposure time control device of the present invention.

FIG. 2 shows the embodiment of the exposure time control device of the present invention that may be usable in the prior art system shown in FIG. 1. The device of the present invention utilizes circuitry which takes into consideration the predetermined exposure time factors such as film sensitivity and aperture value in its determination of the exposure time. The brightness to time conversion circuit 1, the pulse generator 2 and the AND gate 3 shown in FIG. 2 operate consistantly with the like numbered elements shown in FIG. 1 and explained above. The embodiment shown in FIG. 2 also comprises a binary digital counter circuit which includes a plurality of serially connected counting elements such as flip-flop $f_1$–$f_{11}$. A first group of counting elements $f_1$–$f_5$ have input terminals and any one of this group of counting elements may receive the pulse train signal from AND gate 3. The output of AND gate 3 is connected to switch $S_o$ which is a multicontact switch. The movable arm of the multicontact $S_o$ is connected to the output of AND gate 3 and the plurality of contacts $C_1$–$C_5$ of the switch are connected to the inputs of counting elements $f_1$–$f_5$ respectively. A second group of counting elements $f_5$–$f_{11}$ have their outputs connected to switching elements $t_1$–$t_7$ respectively. The outputs of the switching circuit $t_1$–$t_7$ are connected to indicating elements $L_1$–$L_7$ respectively which may be indicating lamps or luminous diodes. These indicating elements may be installed in the finder of a camera and are used to indicate the determined shutter speed. They may also indicate that the exposure time is outside the available range of the camera and thus the OVER and UNDER indications have been added. The switching circuits are interconnected so that only the one indicating element corresponding to the actual exposure time will be enabled to light up.

The operation of the preferred embodiment of the present invention will now be described. For example, if the user of the camera decides to use a film that has an ASA number of 100 for scene brightness B, the switch $S_o$ is connected to contact $C_3$ which has been predetermined in accordance with that particular film sensitivity. Then, a pulse train signal from the gate circuit 3 is sent through switch $S_o$ and is applied to the input of counting element $f_3$ of the binary counter circuit. As is clear from the counter shown in FIG. 2, the pulse train signal corresponding to the scene brightness is counted in the counter and stored therein. In this example, counting element $f_8$ stores the highest digit of the count and therefore switching circuit $t_4$ enables indicating element $L_4$ to light up thus indicating that an exposure time of 1/125 of a second is necessary. If for the same scene brightness B, a film with a sensitivity of ASA 200 is used, then the switch $S_o$ is moved to be connected with contact $C_2$. In this case, the number of pulses from the output of the gate circuit 3 is the same as in the previous case, but because the pulse train signal is now applied to the input of the counter element $f_2$, the count will only be stored in the counting elements up to $f_7$. Counting element $f_7$ will cause switching circuit $t_3$ to enable indicating element $L_3$ which will indicate that an exposure time of 1/250 of a second is necessary. Likewise, when a film with a sensitivity of ASA 50 is used for the same scene brightness B, the proper exposure time of 1/60 of a second can be obtained by switching the arm of switch $S_o$ to contact $C_4$.

In the above-mentioned examples, it has been clearly shown that the device of the present invention receives the electric pulse train signal and converts it into an exposure time count corresponding in time to the exposure time and having a magnitude which varies for the number of pulses received in accordance with predetermined exposure time factors. In these examples, the aperture value was not taken into consideration in order to make the explanation brief. However, any number of exposure time factors can be taken into account by changing the input position in the digital counter circuit by use of the multi-position switch $S_o$ as was done in the example which took into account the film sensitivity. The multi contact or multi-position switch is more desirable if it has as many contacts as necessary for the number of ASA or F-stop numbers.

According to the embodiment of the present invention, the exposure time can be determined with extremely high accuracy since it takes into consideration exposure time factors other than the scene brightness. In addition, the indication of the exposure time is easily obtained by taking the output from the digital counter circuit and using it to enable indicating elements such as those described herein.

The device shown in FIG. 2 may be utilized with the other elements described in FIG. 1 to control the opening and closing of the camers shutter.

While a preferred embodiment of the invention has been shown by way of example in the drawing, it will be understood that the invention is in no way limited to this embodiment.

What we claim is:

1. A device for determining the exposure time in a camera for a sensed scene brightness and in accordance with predetermined exposure time facors comprising: means responsive during use to the brightness of a scene to be photographed for developing an electric pulse train signal having a number of pulses in inverse proportion to the brightness of the scene; means receptive of said electric pulse train signal for converting same into an exposure time count corresponding in time to the exposure time and having a magnitude which varies for the number of pulses received in accordance with predetermined exposure time factors comprising counting means for counting the number of pulses in said electric pulse train signal including a first group of counting elements wherein any one of which is receptive at the input thereof of said electric pulse train signal and a second group of counting elements developing a count which corresponds to the exposure time count wherein the magnitude of the final count depends upon which one of said first group of counting elements receives said electric pulse train signal, and switching means connected between the first mentioned means and said counting means receptive of said electric pulse train signal and settable to positions corresponding to predetermined exposure time factors for selectively applying said electric pulse train signal to alternative ones of said first group of counting elements in accordance with predetermined corresponding exposure time factors; whereby the magnitude of the exposure time count and thereby the exposure time is determined in accordance with brightness of the scene being photographed and predetermined exposure time factors.

2. A device according to claim 1, wherein said means for developing an electric pulse train signal comprises means responsive to the brightness of the sensed scene for developing an output signal having a time duration inversely proportional to the brightness of the sensed scene, a pulse generator for developing a continuous pulse train and gating means receptive of said output signal and said continuous pulse train for generating said electric pulse train signal.

3. A device according to claim 2, wherein said gating means comprises an AND gate.

4. A device according to claim 1, wherein said counting means comprises a binary digital counter.

5. A device according to claim 4, wherein said binary counter is an up-down counter.

6. A device according to claim 1, further comprising indicating means receptive of the exposure time count in said second group of counting elements for indicating the corresponding exposure time.

7. A device according to claim 6, wherein said indicating means comprises a switching element connected to each output of said second group of counting elements and an indicator lamp connected to each switching element and enabled thereby.

8. A device according to claim 7, wherein said indicating means further comprises means for enabling only the one indicating lamp corresponding to exposure time count to light.

9. A device according to claim 1, wherein said counting means comprises an up-down binary counter for developing the exposure time count equal to N and further comprising means for counting the binary counter down at a frequency equal to the exposure time divided by N, means for sensing the count in said up-down binary counter equal to zero and for developing a shutter closing signal in response thereto.

10. A device according to claim 1, wherein said switching means comprises a multi-contact switch.

* * * * *